F. O. JAQUES, Sr.
MICROMETER GAGE.
APPLICATION FILED JUNE 16, 1919.
1,338,932.
Patented May 4, 1920.
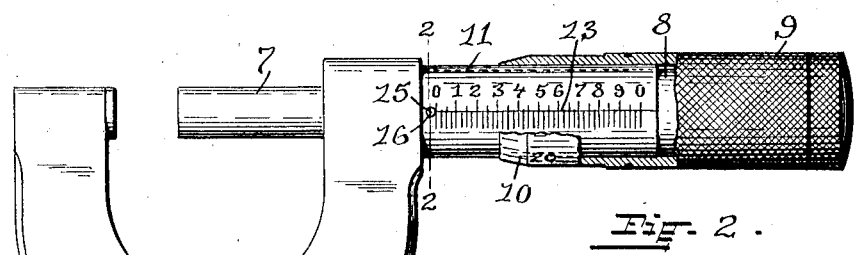
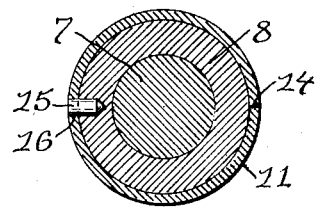
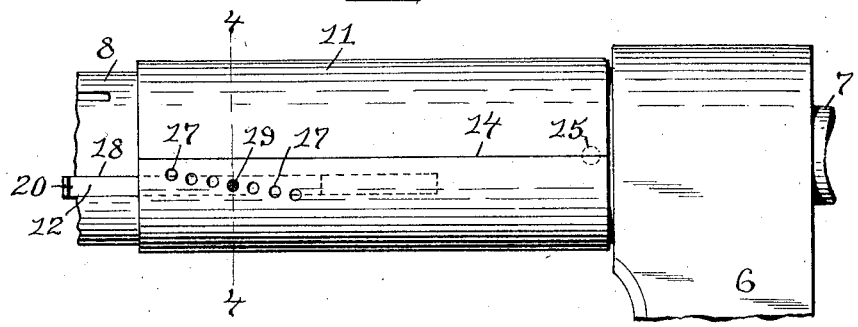
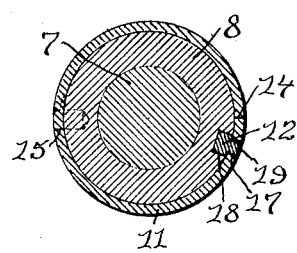
INVENTOR:
Fernando Oscar Jaques, Sr.,
By Chas. H. Luther
ATTORNEY.

UNITED STATES PATENT OFFICE.

FERNANDO OSCAR JAQUES, SR., OF PROVIDENCE, RHODE ISLAND, ASSIGNOR TO THE CENTRAL TOOL COMPANY, OF CRANSTON, RHODE ISLAND, A CORPORATION OF RHODE ISLAND.

MICROMETER-GAGE.

1,338,932.  Specification of Letters Patent.  Patented May 4, 1920.

Application filed June 16, 1919. Serial No. 304,517.

*To all whom it may concern:*

Be it known that I, FERNANDO OSCAR JAQUES, Sr., a citizen of the United States, residing at Providence, in the county of Providence and State of Rhode Island, have invented a new and useful Improvement in Micrometer Gages, of which the following is a specification.

My invention has reference to an improvement in micrometer gages and more particularly to an improvement in the micrometer gage shown and claimed in my United States Patent No. 934,730, September 21, 1909.

My present invention relates more particularly to an improvement in the reading sleeve which surrounds the barrel of the micrometer and which carries the reading line and numerals indicating units of measurement and has a twisting movement on the barrel, when adjusted, in assembling or to compensate for wear.

The object of my invention is to improve the means for adjusting the reading sleeve on the barrel whereby the sleeve is more easily, accurately and quickly adjusted and locked in the adjusted position and the cost of construction greatly reduced.

My invention consists in the peculiar and novel construction of the reading sleeve and means for accurately adjusting the reading sleeve to a fraction of a thousandth part of an inch on the barrel of a micrometer gage, and means for locking the reading sleeve in the adjusted position, said reading sleeve and locking means having details of construction, as will be more fully set forth hereinafter and claimed.

Figure 1 is a front view of a micrometer gage provided with my improvement and showing a portion of the thimble broken away to more clearly show the reading sleeve.

Fig. 2 is an enlarged detail transverse sectional view taken on the line 2.2 of Fig. 1 through the spindle barrel and reading sleeve.

Fig. 3 is an enlarged back view of the reading sleeve showing the thimble removed, the end of the barrel and the greater portion of the handle broken away.

Fig. 4 is an enlarged transverse sectional view taken on line 4.4 of Fig. 3 through the spindle, barrel and sleeve, and Fig. 5 is an enlarged perspective view of the sleeve locking bolt.

In the drawing 6 indicates the handle, 7 the spindle, 8 the barrel, 9 the thimble having the usual beveled end on which are lines and numerals 10 indicating units of measurement of a micrometer gage provided with my improved reading sleeve 11 and locking bolt 12.

The sleeve 11 surrounds the barrel 8 intermediate the barrel and the thimble 9 and has the usual graduated micrometric reading line 13 on the front and parallel with the sleeve axis. Opposite this reading line on the back is a longitudinal slit 14 extending through the length of the sleeve and normally parallel with the reading line on the front. A small pin 15 extends through a hole 16 in the sleeve on the reading line and into the barrel, thereby securing the sleeve at its inner end to the barrel, as shown in Figs. 1 and 2. On the back of the sleeve adjacent the split 14 and at an angle thereto, and to the reading line on the front is a row of small holes 17. 17 the distance between two parallel lines drawn longitudinally and centrally through the end holes being one-thousandth of an inch. With seven holes as shown one-thousandth of an inch is divided into six equal parts. The locking bolt 12 has a sliding fit in a groove 18 formed longitudinally in the barrel 8, a stud 19 which enters a hole 17 in the sleeve 11 and a nick 20 in the outer end of the bolt, to facilitate operation of the bolt.

When it is necessary to adjust for inaccuracy in or wear on the spindle threads, the thimble 9 is removed and that portion of the sleeve 11 having the holes 17. 17 is slightly raised by a tool, not shown, inserted between the barrel 8 and the end of the sleeve 11 so as to clear the stud 19 on the locking bolt 12. The sleeve is now twisted on the barrel in the direction required to bring the reading line 13 on the sleeve into accurate relation with the lines 10 on the thimble 9. The locking bolt 12 is now moved in the groove 18 until the stud 19 enters a hole 17 in the sleeve, thereby locking the sleeve in the adjusted position.

The number of the holes 17. 17 in the sleeve 11 may be varied so that an adjustment of any required part of one-thousandth of an inch may be obtained also any equivalent of the holes 17. 17 may be used, to achieve the same result.

Having thus described my invention I claim as new:—

1. In a micrometer gage having a spindle, a barrel and a thimble over the barrel of an adjustable split reading sleeve surrounding the barrel and having on its front a longitudinal reading line and lines and numerals, indicating units of measurement, means on the front for securing one end of the reading sleeve to the barrel and means on the back intermediate the barrel and the reading sleeve, to lock the reading sleeve in the adjusted position.

2. In a micrometer gage having a spindle, a barrel and a thimble over the barrel of an adjustable split reading sleeve surrounding the barrel and having on its front a longitudinal reading line, means on the front for securing one end of the reading sleeve to the barrel and adjustable means on the back operatively connecting the barrel with the reading sleeve, to lock the reading sleeve in the adjusted position.

3. In a micrometer gage having a spindle, a barrel and a thimble over the barrel of an adjustable split reading sleeve surrounding the barrel and having on its front a longitudinal reading line, a pin extending through one end of the reading sleeve into the barrel, a locking member slidably supported on the barrel and means on the locking member engaging with the reading sleeve to lock the reading sleeve to the barrel in the adjusted position.

4. In a micrometer gage having a spindle, a barrel and a thimble over the barrel of an adjustable split reading sleeve surrounding the barrel and having on its front a longitudinal reading line, a pin on the front extending through one end of the reading sleeve into the barrel, said reading sleeve having a series of holes in the back, a locking member slidably supported in a groove in the barrel and a stud on the locking member which enters a hole in the reading sleeve and locks the reading sleeve in the adjusted position.

5. In a micrometer gage having a spindle, a barrel and a thimble over the barrel of an intermediate adjustable reading sleeve split lengthwise on the back, and surrounding the barrel, and having on its front a longitudinal reading line, a pin on the front extending through one end of the reading sleeve into the barrel, said reading sleeve having a line of holes in the back at an angle to the axis of the sleeve, a locking bolt slidably supported in a groove in the barrel and having a nick in its outer end and a stud which enters a hole in the line of holes in the back of the reading sleeve and locks the reading sleeve in the adjusted position.

In testimony whereof I have signed my name to this specification.

FERNANDO OSCAR JAQUES, Sr.